O. P. HADCOCK & F. W. PIERCE.
Milk-Coolers.

No. 158,840.

Patented Jan. 19, 1875.

WITNESSES
Eugene W. Johnson
Geo. E. Upham

INVENTORS
Oscar P. Hadcock
Frank W. Pierce
Chipman Hosmer & Co
ATTORNEYS

UNITED STATES PATENT OFFICE.

OSCAR P. HADCOCK AND FRANK W. PIERCE, OF COPENHAGEN, NEW YORK.

IMPROVEMENT IN MILK-COOLERS.

Specification forming part of Letters Patent No. 158,840, dated January 19, 1875; application filed December 19, 1874.

*To all whom it may concern:*

Be it known that we, OSCAR P. HADCOCK and FRANK W. PIERCE, both of Copenhagen, in the county of Lewis and State of New York, have invented a new and valuable Improvement in Milk-Cooler; and we do hereby declare that the following is a full, clear, and exact description of the construction and operation of the same, reference being had to the annexed drawings, making a part of this specification, and to the letters and figures of reference marked thereon.

Figure 1:
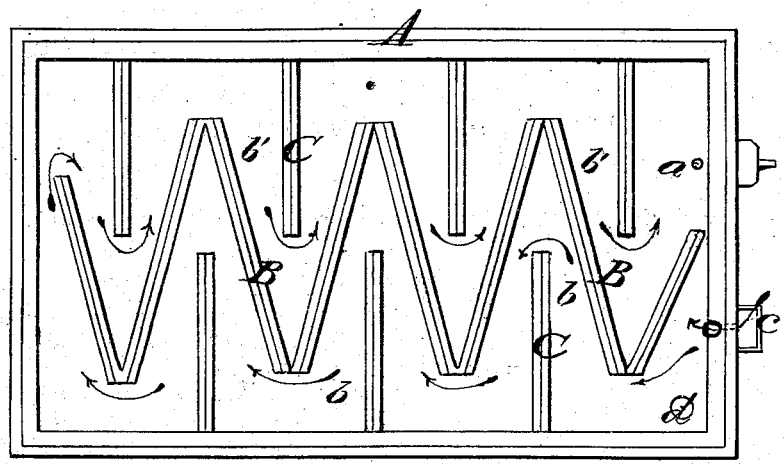
Figure 2:
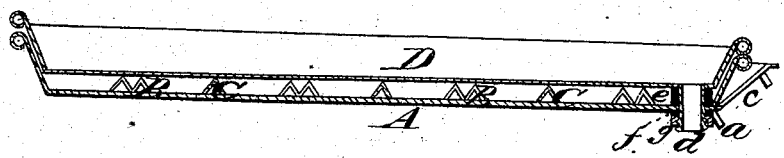
Figure 3:
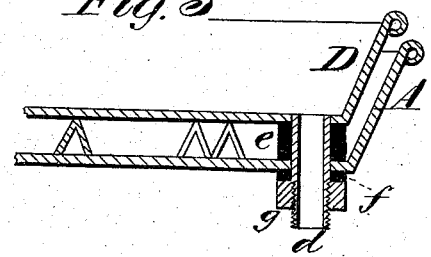

Figure 1 of the drawing is a representation of a plan view of our milk-cooler, and Fig. 2 is a longitudinal vertical sectional view of the same. Fig. 3 is a sectional detail view.

This invention has relation to pans for cooling milk; and the nature of our invention consists in the employment of two separable pans fitting one within the other, the bottom pan having partitions arranged in it so as to form a zigzag passage for the circulation and distribution of the water between the bottoms of the two pans, which passage leads into and out of the same end of the bottom pan.

In the annexed drawings, A designates a rectangular pan of any suitable capacity, and B designates a zigzag partition running centrally from one end of the pan to the other, and having auxiliary ridges or partitions C, extending from the sides of the pan A inward, so as to form in combination with the zigzag partitions B, a passage, $b$, leading from an inlet-funnel, $c$, and a corresponding passage, $b'$, leading from one end of the passage $b$ to the outlet $a$, as shown in Fig. 1.

By this arrangement of the partitions the water is caused to flow laterally as well as longitudinally through passages $b$ $b'$, and to pass from one end of the pan to the other, and then back again. I thus distribute the water, and obtain the best results possible from a small quantity of water.

D designates a pan for containing the milk, which pan is fitted snugly into the pan A, and supported upon the partitions B C, thus covering the water-passages $b$ $b'$. The milk-pan D is provided with a vertical pipe, $d$, which, when the pans are together, passes through the bottom of the pan A, as shown in Figs. 2 and 3. Between the two pans, and surrounding the pipe $d$, is a wooden block, $e$, and on that end of the pipe $d$ which extends through the pan A, an india-rubber washer, $f$, and a nut, $g$, are applied. The washer $f$ will pack the joint, and prevent the escape of water at this point.

What we claim as new, and desire to secure by Letters Patent, is—

The continuous zigzag partition B, attached to one end of the pan A, having inlet and outlet passage $c$ $a$, in combination with the partitions C C, attached to the sides of the pan, and extending into the angles in the zigzag partition B, substantially as described, and for the purpose set forth.

In testimony that we claim the above we have hereunto subscribed our names in the presence of two witnesses.

OSCAR P. HADCOCK.
        FRANK W. PIERCE.

Witnesses:
  EUGENE P. SHERWOOD,
  O. WOODARD.